United States Patent [19]

Faroudja et al.

[11] Patent Number: 4,670,775

[45] Date of Patent: Jun. 2, 1987

[54] INTER-DIMENSIONAL CHROMINANCE NOISE REDUCTION SYSTEM

[75] Inventors: Yves C. Faroudja, Los Altos Hills; Jack J. Campbell, San Francisco, both of Calif.

[73] Assignee: Faroudja Laboratories, Inc., Sunnyvale, Calif.

[21] Appl. No.: 701,383

[22] Filed: Feb. 14, 1985

[51] Int. Cl.$^4$ .............................................. H04N 9/64
[52] U.S. Cl. ................................................... 358/36
[58] Field of Search ................... 358/36, 37, 166, 167, 358/21 R

[56] References Cited

U.S. PATENT DOCUMENTS

| | | | |
|---|---|---|---|
| 4,242,704 | 12/1980 | Ito | 358/36 |
| 4,268,855 | 5/1981 | Takahashi | 358/36 |
| 4,291,333 | 9/1981 | Warnock | 358/36 |
| 4,305,091 | 12/1981 | Cooper | 358/36 |
| 4,568,969 | 2/1986 | Kanemoto | 358/36 |
| 4,573,070 | 2/1986 | Cooper | 358/36 |

Primary Examiner—Michael A. Masinick
Attorney, Agent, or Firm—David B. Harrison

[57] ABSTRACT

Method and apparatus for controlling operation of a time domain noise reduction system in a color television picture signal path by: detecting spatial picture characteristics in the path and detecting occurrence of temporal picture changes on a field by field basis, generating a control signal in relation to the detected spatial and temporal picture characteristics and applying the control signal to control time domain operation of the noise reduction system.

20 Claims, 3 Drawing Figures

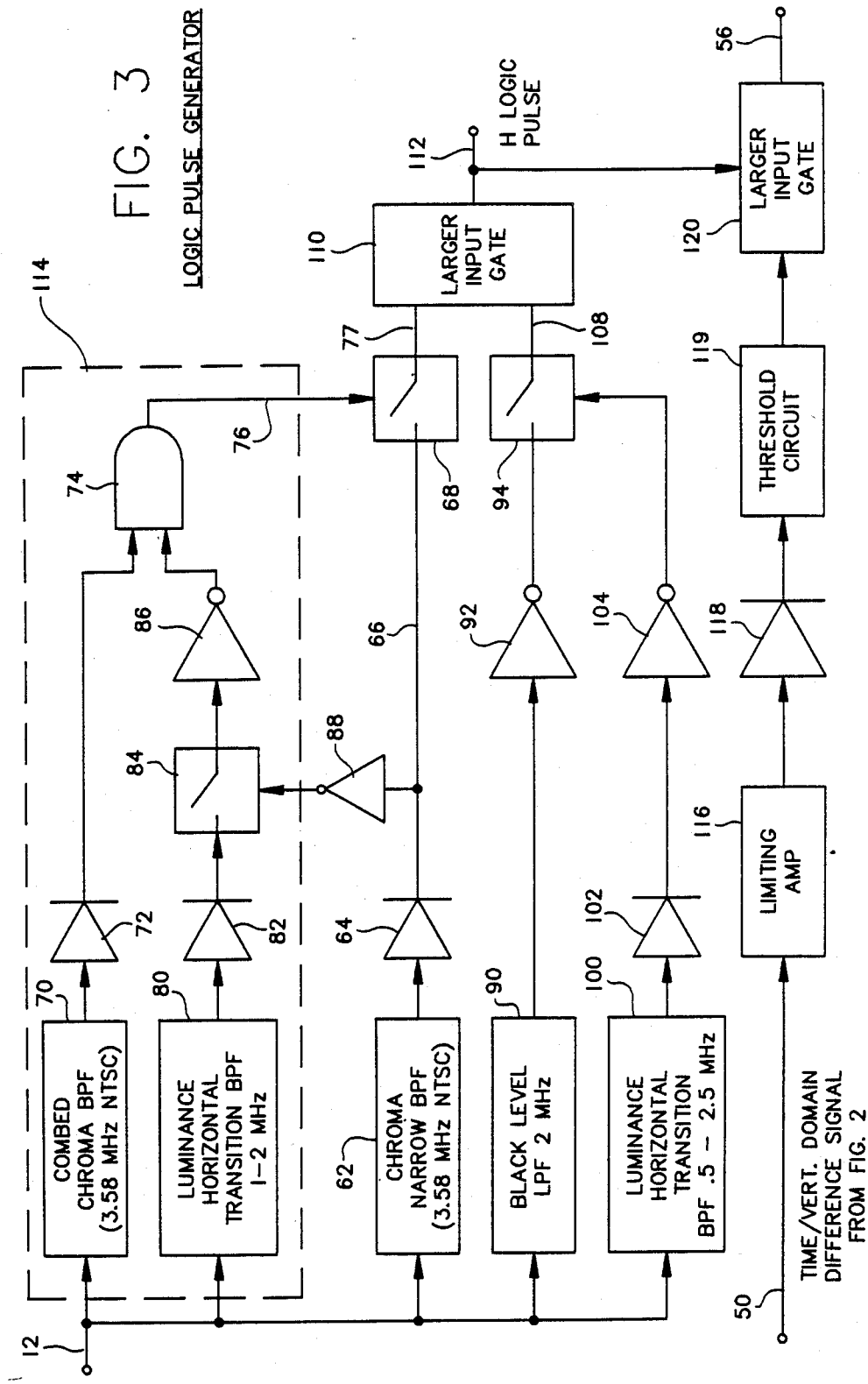

INTER-DIMENSIONAL CHROMINANCE NOISE REDUCTION SYSTEM

BACKGROUND OF THE INVENTION

The present invention relates to color television signal processing systems. More particularly, the present invention relates to reduction of chrominance noise in time domain processing by reference to spatial domain content.

REFERENCE TO RELATED PATENTS

The following patents provide useful background information relating to the present invention:

U.S. Pat. No. 4,030,121 for Video Crispener, Yves C. Faroudja, inventor.

U.S. Pat. No. 4,240,105 for Method and Apparatus for Separation of Chrominance and Luminance with Adaptive Comb Filter in Quadrature Modulated Color Television Systems, Yves C. Faroudja, inventor.

U.S. Pat. No. 4,443,817 for Chroma Noise Reduction System for Quadrature Modulated Color Television Picture Signals, Yves C. Faroudja, inventor.

U.S. patent application Ser. No. 06/349,017, filed on Feb. 16, 1982, now U.S. Pat. No. 4,504,853, for Enhancement of Quadrature Modulated Chroma by Luminance or Chroma Transitions Without Chroma Demodulation, Yves C. Faroudja, inventor.

U.S. patent application Ser. No. 06/701,384, filed simultaneously with the present application and entitled Wide Bandwidth Chrominance Noise Reduction System, Yves C. Faroudja and Jack J. Campbell, co-inventors, the disclosure of which is incorporated herein by reference.

It is known to employ enhancement and noise reduction techniques within the same domain, i.e. horizontal or vertical, to reduce noise in the chrominance component of a quadrature modulated color television picture signal. One prior chroma noise reduction approach is described in the referenced U.S. Pat. No. 4,443,817. Other chroma enhancement methods and apparatus are set forth in the referenced U.S. Pat. No. 4,030,121 and in U.S. Pat. No. 4,504,853.

It is also known that the human eye (and brain) is far less sensitive to chrominance transitions than it is to luminance transitions, whether in the spatial or temporal domains. For this reason, the eye is satisfied with a relatively low bandwidth chrominance signal when accompanied by a high bandwidth luminance signal. Similarly, in the time domain the eye is not very sensitive to chroma transitions occurring faster than one tenth to one twentieth of a second. Since chroma is updated with each field, or at a 50 or 60 Hz rate, it is theoretically possible to spread a chroma noise impulse over as many as six fields without the human eye being able to perceive the process. The present invention brings this concept to reality.

Prior art chroma noise reduction techniques operating in the time domain, i.e. from frame to frame, have typically employed techniques to detect the speed with which a certain object is moving in the picture in order to generate a coefficient of variation. The faster an object is moving, typically the less the prior art noise reduction technique has been permitted to operate. Such prior systems are highly complex and are therefore very expensive.

A hitherto unsolved need has arisen to control the level of television signal processing, particularly chroma noise reduction processing, by reference to spatial content whether it be luminance or chroma.

A further hitherto unsolved need has arisen in the area of noise reduction process control. Noise reduction processing should be disabled at luminance and chrominance transitions. Also, chrominance noise reduction should be disabled when there is very little chroma information present in the picture. On the other hand, croma noise reduction should be provided in special picture conditions such as low overall luminance levels and when chroma levels are very high.

This heretofore unsolved problem arose through the unintended operation of the noise reduction system and resultant generation of unwanted, objectional picture artifacts in response to certain dynamic picture conditions, not instances of chroma noise. A need has arisen from a chroma noise reduction/processing system which operates in relation to the level of chroma present in the signal and which uses spatial dimension and temporal dimension information to determine chroma noise reduction processing levels in the time domain, i.e. over a plurality of picture frames.

SUMMARY OF THE INVENTION WITH OBJECTS

A general object of the present invention is to overcome the limitations and drawbacks of prior art time domain chroma noise reduction techniques.

Another object of the invention is to control television signal processing in the time domain, i.e. field to field, by reference to signal image spatial picture content.

A further object of the present invention is to employ spatial dimension information to control the instantaneous level of video noise reduction being carried out on an inter-field basis in the time domain.

A still further object of the present invention is to employ spatial dimension information to control the instantaneous level of chroma noise reduction being carried out on an interfield basis in the time domain.

One more object of the present invention is to provide a novel system for time domain chroma noise reduction which is vastly simpler in implementation and therefore less costly than prior art approaches, while yielding superior picture enhancement and noise reduction.

In a first aspect, the method of the present invention calls for controlling operation of a time domain chrominance noise reduction system in a color television picture signal path by: detecting spatial picture characteristics in the path, generating a control signal in relation to the detected spatial picture characteristics and applying the control signal to control time domain operation of the noise reduction system.

In a second aspect, the method includes the further steps of: detecting occurrence of picture changes on a field by field basis and inhibiting the noise reduction when the changes are detected.

In a third aspect, the method step of detecting spatial picture characteristics in the path includes the steps of detecting horizontal picture transitions, detecting vertical picture transitions, or both.

A fourth aspect of the method of the present invention calls for controlling operation of a time domain chrominance noise reduction system in a color television picture signal path by: detecting the outline of a visual object, whether stationary or moving, in a color television picture signal in the path, generating a control signal correlated in time to the outline of the detected visual object and applying the control signal to inhibit time domain operation of the noise reduction system during the control signal.

A fifth aspect of the method of the present invention calls for generating a chroma difference signal for controlling operation of a time domain chrominance noise reduction system operating upon a chrominance component of a color television signal, by the steps of:

generating a Vout function of the chrominance in accordance with the following:

$$V\text{out} = \frac{V\text{in delayed by }(F1 + \tfrac{1}{2}H) + V\text{in delayed by}(F1 - \tfrac{1}{2}H)}{2},$$

where Vin equals the incoming chrominance component of the color television signal, F1 equals a field interval of the color television signal, and ½H equals one half of a line interval of the color television signal, subtracting the Vout function from the chrominance component to yield a difference signal, amplifying the difference signal by a predetermined coefficient of recirculation to yield a normalized value, detecting picture conditions in the color television signal and generating a logic control signal related to the conditions, multiplying the normalized value by the logic pulse to yield a recirculation value, and adding the recirculation value to the chrominance component to yield a demodulated chroma error signal.

In a sixth aspect, the method step of the fifth aspect for generating Vout is carried out digitally and comprises the further steps of sampling and converting the incoming chrominance component Vin to digital values, and converting the resultant digital Vout function to analog values in real time.

In a seventh aspect, the method of the present invention calls for time domain chrominance noise reduction in a quadrature modulated color television signal, in accordance with the the steps of:

demodulating the quadrature modulated color television signal into two chrominance components in quadrature, separately for each said component;

generating a Vout function of the component in accordance with the following:

$$V\text{out} = \frac{V\text{in delayed by }(F1 + \tfrac{1}{2}H) + V\text{in delayed by}(F1 - \tfrac{1}{2}H)}{2},$$

where Vin equals the incoming chrominance component, F1 equals a field interval, and ½H equals one half of a line interval of the color television signal, subtracting the Vout function from the chrominance component to yield a difference signal, amplifying the difference signal by a predetermined coefficient of recirculation to yield a normalized value, detecting picture conditions in the color television signal and generating a logic control signal related to the detected conditions, multiplying the normalized value by the logic pulse to yield a recirculation value, adding the recirculation value to the chrominance component to yield a demodulated chroma difference signal for the component, remodulating the chroma difference signals for said quadrature demodulated chroma components to yield a modulated chroma error signal, and subtracting the modulated chroma difference signal from said quadrature modulated color television picture signal in proper time correlation to provide chroma noise reduction thereto.

In an eighth aspect, the seventh aspect method further comprises the steps of noise reduction in the horizontal spatial domain and/or in the vertical spatial domain.

A ninth aspect of the present invention provides apparatus for generating a chroma time domain difference signal for controlling operation of a time domain chrominance noise reduction system operating upon a chrominance component of a color television signal. The apparatus includes:

a chroma input for receiving an incoming demodulated chroma component, a summing junction having a first input connected to the chroma input and having an output, a processor (preferably digital) connected to the output of the summing junction for generating a Vout function in accordance with the following expression:

$$V\text{out} = \frac{V\text{in delayed by }(F1 + \tfrac{1}{2}H) + V\text{in delayed by}(F1 - \tfrac{1}{2}H)}{2},$$

where Vin equals the incoming chrominance component, F1 equals a field interval, and ½H equals one half of a line interval of the color television signal, a difference junction connected to the output of the summing junction and to subtract therefrom the Vout function from the processor to yield a difference value, a coefficient of recirculation amplifier connected to the difference junction for amplifying the difference value in accordance with a predetermined coefficient of recirculation to yield a recirculation value, a logic generator connected to receive the color television signal to determine picture conditions therein and to generate a logic signal in accordance therewith, a linear multiplier connected to multiply the recirculation value by the logic signal, to yield a demodulated chroma time domain difference signal, the output of the multiplier being connected as a second input to the summing junction to cause recirculation of the demodulated chroma time domain difference signal with the incoming chroma component.

These and other objects, advantages and features of the present invention will be better understood and further appreciated by considering the following detailed description of a preferred embodiment, presented in conjunction with the accompanying drawings.

BRIEF DESCRIPTION OF THE DRAWINGS IN THE DRAWINGS

FIG. 3 is a detailed block diagram of a logic pulse generator element employed in the FIG. 1 embodiment of the present invention.

DETAILED DESCRIPTION OF A PREFERRED EMBODIMENT

A. Time Domain Chroma Noise Reduction System 10

Figure 1:
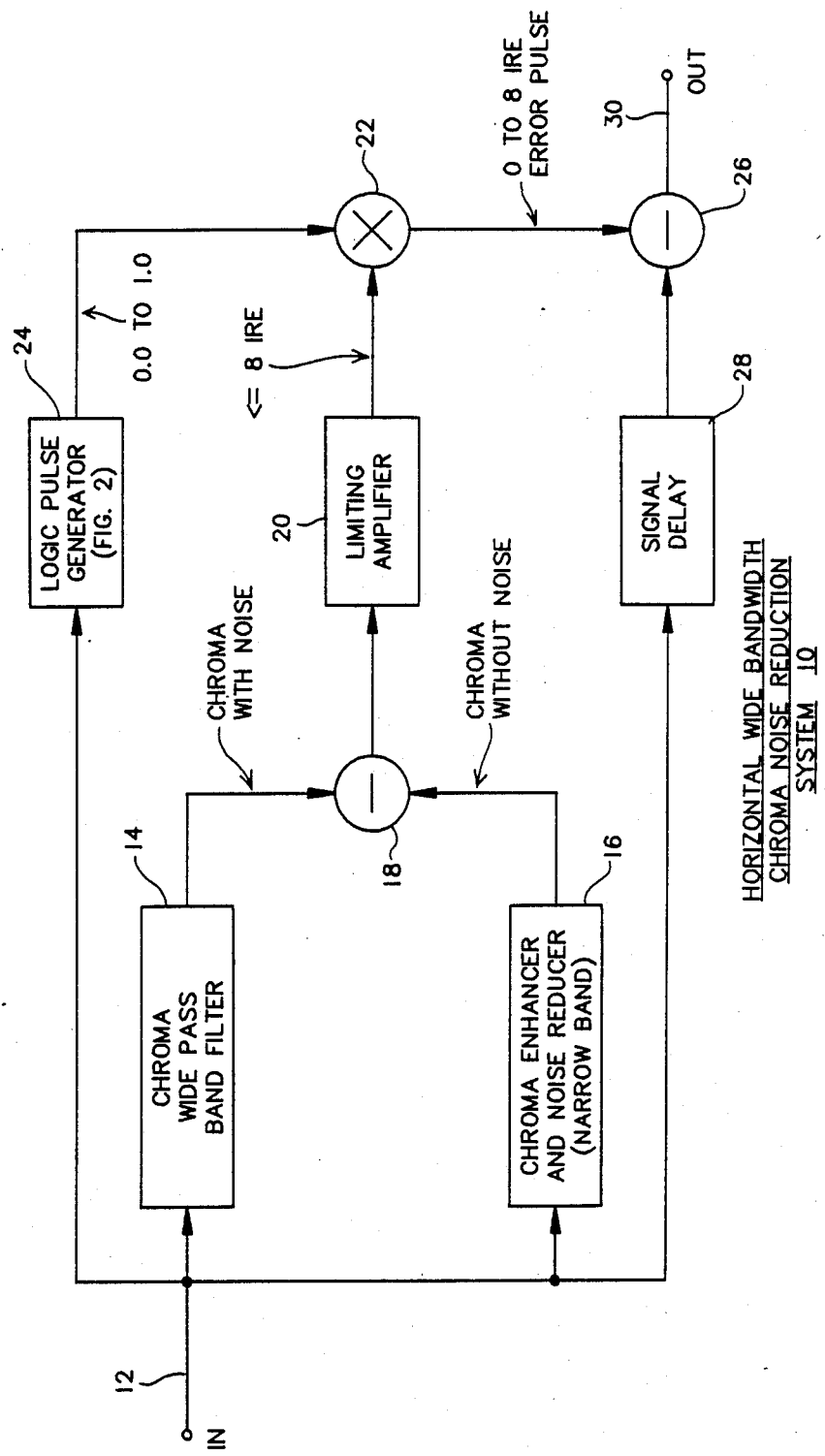
FIG. 1 is an overall system block diagram of an inter-dimensional chroma noise reduction system in accordance with the principles of the present invention.

An inter-dimensional chroma noise reduction system 10 following the principles of the present invention is depicted in electrical overview in FIG. 1. Therein the system 10 includes an input node 12 for receiving a quadrature modulated color television picture signal in the accepted formats, e.g., NTSC or PAL. The input signal passes along three paths. The first path is through a horizontal noise reduction system 14, a vertical noise reduction system 16, a chroma demodulator 18, two identical time/vertical domain noise reduction error generators (FIG. 2), a chroma remodulator 24, and a difference circuit 26. The second path is through a logic pulse generator 22 (FIG. 3), and the third path is through a delay match circuit 28.

The first processing path is through the horizontal enhancement/noise reduction system 14 which may include enhancement and noise reduction of both luminance and chrominance, as of the type disclosed in the referenced U.S. Pat. No. 4,030,121, the disclosure of which is incorporated herein by reference, or of chroma only as of the type disclosed in the referenced U.S. patent application Ser. No. 06/701,384.

Next, the signal passes through the vertical domain noise reduction system 16, which may be of chroma as the type disclosed in the referenced U.S. Pat. No. 4,443,817, the disclosure of which is hereby incorporated by reference.

The horizontal system 14, and the vertical system 16 are not essential elements of the system 10. However, either or both systems 14, 16 will add measureably to the overall performance of the system 10, and the horizontal system 14 is preferred over the vertical system 16, if only one of them is to be included.

The enhanced color picture then passes via a line 17 through a chroma demodulator 18 of conventional design. The demodulator detects, separates and puts out the two chroma components in quadrature. Herein, these components are labelled "I" and "Q". The I and Q terms are used in the art only in connection with the NTSC format, while the terms "U" and "V" are used in the PAL format for corresponding signals. It will be evident to those skilled in the art that the principles of the present invention and this description applies to NTSC or PAL chroma components which have been demodulated on any two quadrature axes, such as the Red-Y (luminance) axis or the Blue-Y axis.

The demodulated I components then enters the first time/vertical domain noise reduction error generator 20a, described hereinafter in connection with FIG. 2, and the demodulated Q component simultaneously enters the second time/vertical domain noise reduction error generator 20b, identical with the first generator 20a. The generators 20a and 20b generate chroma error signals I' and Q' in accordance with a logic pulse generated by the FIG. 3 logic pulse generator 22 which responds primarily to spatial information. The generators 20a and 20b then put the error components I' and Q' out to the chroma remodulator 24.

The chroma remodulator 24 remodulates the chroma error components I' and Q' into quadrature modulated chroma information at the chroma subcarrier frequency. This information is then subtracted in proper phase from the main path color video picture signal in the subtractor circuit 26. The delay match circuit 28 which is connected between the input node 12 and the difference circuit 26 provides the main path with the proper phase delay so that the subtractor 26 is able to combine the two signals to cancel the chroma noise out of the main path signal. A relatively short delay, on the order of one to two microseconds is sufficient for the delay circuit 28. The main path color television picture signal from which unwanted chroma noise has been removed by the system 10 is then put out at the output node 30.

B. Time/Vertical Noise Reduction Error Generator 20

Figure 2:
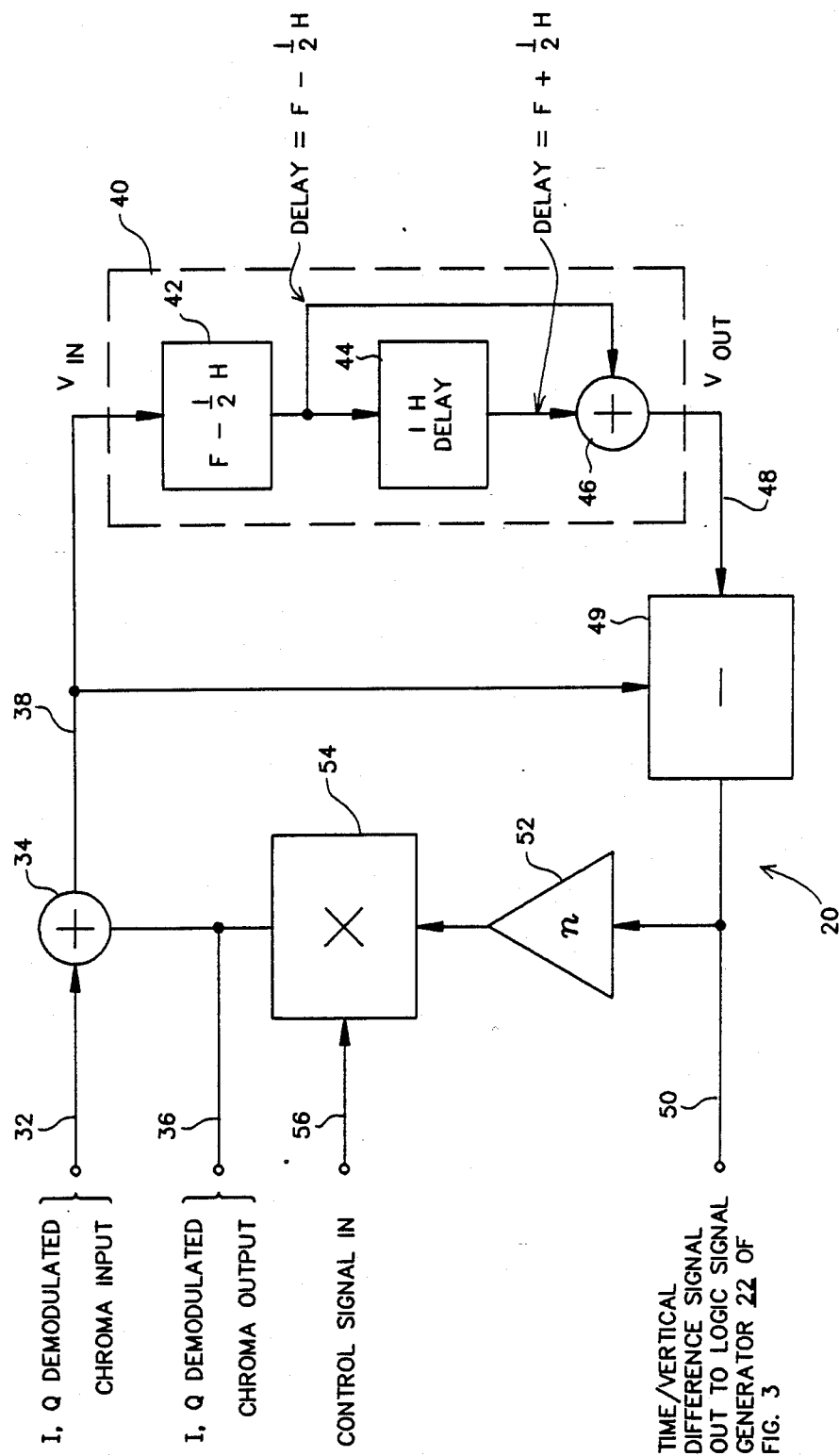
FIG. 2 is a more detailed block diagram of a time/vertical domain noise reduction error signal generator element employed twice in the FIG. 1 embodiment of the present invention.

The time/vertical noise reduction error generator 20 (which is the preferred implementation for each of the generators 20a and 20b of FIG. 1) is depicted in greater structural detail in FIG. 2. Therein, the demodulated chroma component (I or Q) comes in via an input line 32 from the chroma demodulator 18. It immediately enters a summing junction 34. The summing junction 34 provides for recirculation of a frictional amount of a chroma error signal which effectively spreads a chroma noise impulse over a plurality of adjacent fields of the picture, and over a plurality of adjacent scanning lines both upwardly and downwardly in the vertical domain.

The summing junction has an output designed by the reference numeral 38. This output leads to a digital processor 40 and also directly to a difference circuit 49.

The digital processor 40 processes the chroma component in accordance with the following algorithm:

$$V_{out} = \frac{V_{in} \text{ delayed by } (F1 + \tfrac{1}{2}H) + V_{in} \text{ delayed by}(F1 - \tfrac{1}{2}H)}{2},$$

where Vin equals the incoming chrominance component, F1 equals a field interval, and ½H equals one half of a line interval of the color television signal. The incoming chroma component Vin is bandwidth limited so that it is not greater than approximately 600 kilohertz. This signal is then digitized into eight-bit words by a fast analog to digital converter, not shown, which operates at a sampling rate of 3.25 MHz, well above the Nyquist limit. In practice, the conversion of each sample into an eight bit word has proven to be satisfactory.

Internally, the processor 40 includes a field memory 42 for storing a field of digitized chroma component values. The timing of this storage element 42 is such that it is one half of a line early. The stored values then pass through a delay 44 which is precisely of one line duration. This provides a field output which is one half of a line late, so that the output between the first memory 42 and the second memory 44 is a delay of one line. The two resultant digital streams from the memories 42 and 44 are summed in real time by a digital summing operation 46. Ordinarily, there will be no differences between the two signal as delayed by one line. Two exceptions are chroma vertical transitions and noise. Each results in the generation of a difference product at the summing operation 46. This difference product is then converted back to analog by a high speed digital to analog converter (not shown) and then put out via a line 48 to the difference circuit 49 where it is subtracted from the main path chroma component on the line 38. At this point in the circuit 20 it is imperative that the signals be very smooth and that there be no discontinuities generated by the digital processor 40.

The difference signal put out by the difference circuit 49 goes into the logic generator 22 (FIG. 3) via a line 50, and also goes to a coefficient of normalization amplifier 52 which amplifies the resultant difference signal by a predetermined factor, usually 2.5 to 3.0. The normalized difference signal then enters a linear multiplier 54 where it is multiplied by a logic pulse generated by the logic pulse generator 22 and received via a line 56 therefrom.

The logic pulse has a functional value between zero and one, and the instantaneous value is determined primarily by the spatial characteristics of the color television picture signal, and also by its time domain characteristics. For example, when a noise pulse recirculates through the generator 20, the logic pulse generator has determined that the artifact is noise and that recirculation is proper. Consequently, the logic level is at or approaching a value of one, and the product of the multiplier 54 is a recirculation value which spreads the chroma noise impulse among adjacent fields. On the other hand, if the artifact is a chroma transition, the logic generator knows this fact and knows that recirculation of a chroma transition will lead to unwanted artifacts and degradation of the picture quality. Consequently, the instantaneous logic pulse is at or approaching a value of zero, and no recirculation occurs. Other conditions of operation of the logic pulse generators will be explained hereinafter.

It will be appreciated by those skilled in the art that it is conceptually preferable to detect and recirculate only chroma errors, such as noise, rather than the entirety of the chroma component. The practical difficulty of this idealized approach is that it requires four full field memories in order to do the necessary calculations and separate the errors from the transitions, etc. If expense were no object, this idealized approach would be preferred, and it is within the scope of the present invention.

The logic control pulse generator 22 is described in FIG. 3. Therein, the composite color picture signal from the input node 12 is shown to pass through six separate processing paths.

A first path through the generator 22, to determine chroma level, is through a chrominance band pass filter 62, having a sharply tuned pass band at the chrominance subcarrier frequency (3.58 MHz in NTSC format). A full wave rectifier 64 (depicted symbolically as a diode in FIG. 3) removes any sign associated with transition direction of the signal from the chroma band pass filter, and puts out a zero value when the absolute value of the chroma received from the band pass filter 62 is low, e.g. 10 IRE units or below. When the chroma level is between 10 and 25 IRE units, the rectifier 64 puts out a value between zero and a predetermined unitary value, which is smoothly and linearly proportional to the chroma level in this transition region between 10 and 25 IRE units. When the detected absolute value of chroma is above e.g. 25 IRE units, the rectifier puts out the unitary value. Thus, it is appreciated that the rectifier 64 includes a non-linear amplifier component which carries out the described non-linear process in putting out a value which is zero to 10 IRE units, linearly increasing between 10 and 25 IRE units and constant above 25 IRE units. This signal is present on a line 66 and enters an electronic switch 68.

The first path operates at the pixel rate. If, for example, a chroma transition occurs from zero amplitude to full amplitude and then returns to zero amplitude in terms of microseconds (line rate), then the signal put out on line 66 will be a transition which begins gently before the sharp chroma transition, and which falls off gently after the end of the sharp chroma transition. Thus, in this example, the signal on line 66 is a chroma transition window. The slope of the window signal on line 66 is more gentle than the chroma transition by a ratio of two or three.

When the picture signal contains an excessive amount of luminance information in the chromance pass band without corresponding chroma information, chroma noise enhancement and reduction is inappropriate and leads to generation and insertion of unwanted picture artifacts. This situation is usually artificially generated, since it most unusual to find a picture pattern of vertical luminance fine lines in the chrominance pass band. However, artificially generated picture signals are becoming more widely generated as with computer techniques. Thus, every signal possibly included in the television picture spectrum should be accounted for in a wideband chroma processing system.

Also, during long periods in which the picture signal is essentially monochrome, the chroma noise reduction/enhancement circuits are unnecessary and should be removed in order to eliminate undesired artifacts otherwise generated in response to luminance phenomena.

The switch 68 is closed by a signal which indicates that the overall value of combed chrominance is above a minimum amount, such as about 10 IRE units, and when luminance transition values, if present, are below another value, such as 10 IRE units. In the event that chroma levels are above a threshold of approximately 40 IRE units, then the switch 68 is closed, as the switch 84 is opened. Operation of the switch 84 is explained subsequently herein in connection with the third path through the logic pulse generator 22.

Second and third paths through the logic generator 22, which are commonly related and are thus identified by the dashed line block 114 in FIG. 2, provide a control signal to operate the switch 68. The second path is through a chrominance comb filter 70 which puts out a signal indicating the chrominance level at the chrominance subcarrier. This value is full wave rectified and put out by a full wave rectifier 72 as a logical high control signal whenever the absolute value of chrominance in the picture signal is determined to be above a threshold level, such as 10 IRE units. This signal is supplied as one input to an AND logic gate 74, which generates a logic output on a line 76 for operating the switch 68.

The third path for the color composite signal through the generator 22 is through a luminance band pass filter 80 having a pass band comprising a high energy region of luminance, such as 1 to 2 megahertz of base band video. This filter 80 develops an output signal indicative of horizontal level transitions occurring in the base band. This output signal is full wave rectified by a rectifier 82 to become an absolute value and enters a fast electronic switch 84. The switch 84 is closed until the chrominance level reaches about 40 IRE units, and the switch opens completely over a narrow range of about 4 IRE units, so that the switching action is very fast, albeit smooth. The inhibition of noise reduction by luminance transitions through elements 80 and 87 is therefore eliminated for high chroma levels.

The signal passing through the switch 84 is inverted in logical sense by an analog inverter 86, the inverted output of which is then sent to the other input of the AND gate 74. The inverted logical output from the inverter 86 is at a logical low level during large horizontal transitions in the picture signal. The output of the AND gate 74 is consequently low during such transitions, unless the switch 84 is opened by the detection of chroma levels above a certain level, such as 40 IRE units.

An inverter including a non-linear amplifier 88 is connected from the chroma level line 66 to operate the switch 84. When the chroma level on the line 66 reaches a high chroma level, such as 40 IRE units, the inverter puts out a logical low signal which opens the switch 84. When chrominance levels are below the predetermined level, the switch 84 remains closed.

It has been determined that chroma noise disturbances are most visible when the overall luminance amplitude is low, i.e. the picture is dark, with many blacks and dark grays. In this situation it is desirable to perform chroma noise reduction irrespective of the other situations in which chroma noise reduction may be appropriate, as explained in conjunction with the first three paths.

Consequently the fourth and fifth paths provide a black level detection and control function. The fourth path includes a black level low pass filter 90 which has a roll off at about 2 megahertz. The signal put out by the black level low pass filter is as follows: when the overall luminance value is e.g. at or below 10 IRE units, the logic level put out by the block 90 is zero. Between e.g. 10 and 20 IRE units, the output varies linearly with the IRE unit value. Above e.g. 20 IRE units, the the output value is at a logical one value.

An inverter 92 inverts the sense of this output signal, so that the inverter 92 puts out a logical one when the luminance value is at and below 10 IRE units, puts out a value which varies linearly between one and zero when the luminance level increases from 10 to 20 IRE units and puts out a zero whenever the luminance value is above 20 IRE units. The output of the inverter enters an electronic switch 94 which remains closed, except during the detection of any horizontal domain luminance transition whereupon it is opened for the duration of the transition.

The fifth path for video is through a horizontal transition band pass filter and detector circuit 100 which has a pass band of approximately 0.5 to 2.5 megahertz in the video base band. This circuit 100 detects each horizontal luminance transition and puts out a value for each horizontal transition. The sense of the output is made absolute by a full wave rectifier 102, and is then inverted by an inverter 104. The inverter 104 provides an output which is high or on, except during the luminance transition when it goes low, and opens the switch 94, preventing the signal from the black detection fourth path from passing, thereby enabling control of chroma noise reduction by the first, second and third path signals, during picture conditions where e.g. luminance gray levels are high only when a luminance transition is present.

The outputs from the switches 68 and 94 provide two inputs 106, 108, respectively, to a "larger input" gate 110. The larger input gate passes to an output 112 the larger signal present on each input. The signal on each input 106, 108 is a fractional value between zero and one. If the signal on the input 108 from the black level detection path is 0.7 and the signal on the input 106 from the chroma transition window paths one through three is a 0.4, then the gate 110 puts out a 0.7 value as a horizontal component logic control pulse on a line 112. This signal may be effectively used by the horizontal noise reduction system 14 if it is in accordance with the disclosure of the referenced simultaneously filed patent application Ser. No. 06/701,384.

The larger input gate circuit 110 may be implemented as is shown in FIG. 9, of U.S. patent application Ser. No. 06/349,017, now U.S. Pat. No. 4,504,853, which disclosure is incorporated herein by reference.

The sixth and final path through the logic pulse generator is a field/line difference detection path, and it begins with the field/line change or error signal developed at the output subtraction element 49 in FIG. 2. That output on the line 50 is supplied directly on the logic pulse generator 22 and enters a limiting amplifier 116 which limits its value over a predetermined amount to a constant value. The limited output of the amplifier 116 is then rendered as an absolute value by a full wave rectifier element 118 followed by a threshold circuit 119 whose function is to eliminate small field/line differences from the logic path and therefore to avoid switching off noise reduction by the noise itself (rectified noise peaks). The threshold level set into the threshold circuit 119 will depend upon the overall system environment. If the horizontal and vertical domain processors 14 and 16 of FIG. 1 are included in the system, then the noise will be low level, and a threshold typically in the range between 5 and 10 IRE units is preferred.

The absolute value for field/line differences is a zero value when there are no changes in real time from field to field and/or line to line and which is a one value (signifying a need to inhibit chroma noise reduction processing) whenever changes from field to field and/or line to line are detected.

The field/line difference values are supplied to a second larger input gate 120, of the type used as the input gate 110. Also supplied to the second larger input gate 120 is the output from the first larger input gate 110 on the line 112. This output, representing the horizontal domain logic pulse is combined with the time domain or field delta pulse, and the larger of the two values at the inputs of the gate 120 is supplied on the control line 56 to inhibit recirculation of the FIG. 2 chroma error component generator 20. Thus, it will be appreciated that the logic pulse generator 22 favors inhibition of chroma noise reduction, wherenever any of the state inhibiting conditions are present in the horizontal path, and whenever, should those conditions not be present, motion and/or vertical changes are detected via signals put out on the line 50.

It is noted herein, and will be evident to those skilled in the art that the method of noise reduction presented and discussed in conjunction with the subsystem 20 of FIG. 2 is very efficient for the reduction of luminance noise, as well as chroma noise. In the case of the subsystem 20 being used for luminance noise reduction, the signal at the input line 32 is not demodulated chroma but rather is luminance. Its bandwidth is greater than 2 MHz. Thus, the digital circuitry of the processor 40 would operate at a suitably higher clocking rate, such as 14.5 MHz.

Even though the present description applies to PAL and NTSC quadrature modulated color television signals and systems, its application to SECAM (line sequential color modulated FM subcarrier) signals and systems will be appreciated by those skilled in the art. Furthermore, to those skilled in the art to which the present invention pertains many widely varying embodiments and changes in construction will be apparent without departing from the spirit and scope of the present invention as more particularly specified by the appended claims. The description and the disclosures herein are purely illustrative and are not intended in any sense to be limiting of the scope of this invention.

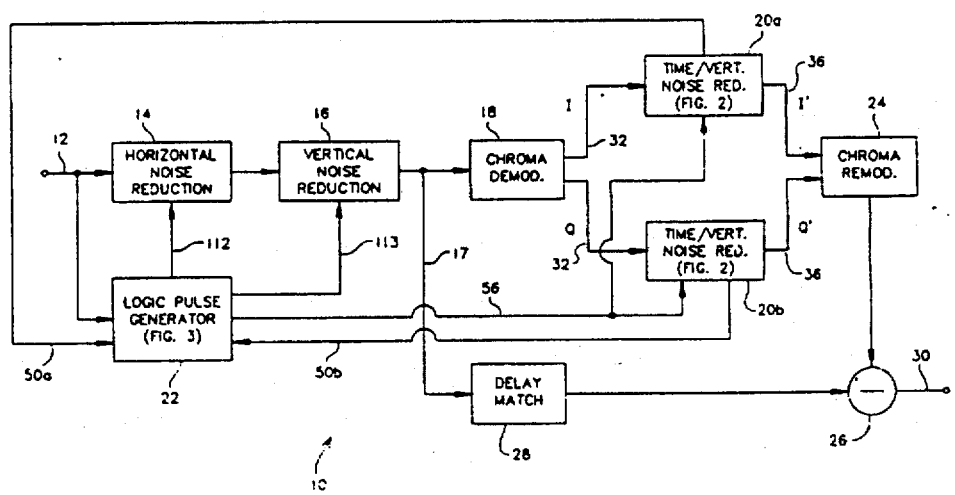

We claim:

1. A method for controlling a chrominance signal component noise reduction process of a color television signal by recirculating a chrominance signal component in at least one of the temporal domain and a combination of the temporal and vertical domains in accordance with a variable coefficient of recirculation, the method including the steps of:

detecting a representative signal in said path in at least one of the horizontal, vertical and temporal domains which signal is at least one of luminance signal component level, luminance signal component level transition, and a combination of the luminance component and the chrominance component in said path, generating a control signal from said detected representative signal to vary the coefficient of recirculation.

2. The control method set forth in claim 1 wherein the step of detecting a representative signal in said path includes the step of detecting occurrence of the representative signal on a field by field basis and includes the further step of adjusting the representative signal to eliminate line interlace spatial offset from field to field.

3. The control method set forth in claim 1 wherein said step of detecting a representative signal in said path comprises the step of detecting luminance component level transitions in the horizontal domain.

4. The control method set forth in claim 1 wherein said step of detecting a representative signal in said path comprises the step of detecting luminance component level transitions in the vertical domain.

5. The control method set forth in claim 1 wherein said step of detecting a representative signal in said path comprises the steps of detecting luminance component level transitions in the horizontal domain and detecting luminance component level transitions in the vertical domain.

6. The control method set forth in claim 1 wherein the step of detecting a representative signal in said path comprises the step of detecting chroma level and luminance level transitions in the horizontal domain.

7. The control method set forth in claim 1 wherein the step of detecting a representative signal in said path comprises the step of detecting luminance level and level transitions in the horizontal domain.

8. A method for generating a chroma error signal for controlling operation of a time domain chrominance noise reduction system operating upon a chrominance component of a color television signal, said method comprising the steps of:

generating a Vout function of said chrominance in accordance with the following:

$$V_{out} = \frac{V_{in} \text{ delayed by } (F1 + \tfrac{1}{2}H) + V_{in} \text{ delayed by}(F1 - \tfrac{1}{2}H)}{2},$$

where Vin equals the incoming chrominance component, F1 equals a field interval, and ½H equals one half of a line interval of said color television signal, subtracting said Vout function from said chrominance component to yield a difference signal, amplifying said difference signal by a predetermined coefficient of recirculation to yield a normalized value, detecting picture conditions in said color television signal and generating a logic control signal related to said conditions, multiplying said normalized value by said logic control signal to yield a recirculation value, adding said recirculation value to said chrominance component to yield a demodulated chroma error signal.

9. The method set forth in claim 8 wherein said step for generating Vout is carried out digitally and comprises the further steps of sampling and converting said incoming chrominance Vin to digital values, and converting said resultant digital Vout function to analog values in real time.

10. The method set forth in claim 9 wherein said sampling step is carried out at a sampling rate which is at least twice the demodulated bandwidth of said chrominance component.

11. A method for time domain chrominance noise reduction in a quadrature modulated color television signal, said method comprising the steps of:

demodulating said quadrature modulated color television signal into two chrominance components;

generating separately for each said component a Vout function of said component in accordance with the following:

$$V_{out} = \frac{V_{in} \text{ delayed by } (F1 + \tfrac{1}{2}H) + V_{in} \text{ delayed by}(F1 - \tfrac{1}{2}H)}{2},$$

where Vin equals the incoming chrominance component, F1 equals a field interval, and ½H equals one half of a line interval of said color television signal, subtracting said Vout function from said chrominance component to yield a difference signal, amplifying said difference signal by a predetermined coefficient of recirculation to yield a normalized value, detecting picture conditions in said color television signal and generating a logic control signal related to said conditions, multiplying said normalized value by said logic control signal to yield a recirculation value, adding said recirculation value to said chrominance component to yield a demodulated chroma error signal for said component, remodulating said chroma error signals for said chroma components to yield a modulated chroma error signal, and subtracting said modulated chroma error signal from said quadrature modulated color television picture signal in proper time correlation to provide chroma noise reduction thereto.

12. The time domain chroma noise reduction method set forth in claim 11 further comprising the step of noise reduction in the horizontal spatial domain.

13. The time domain chroma noise reduction method set forth in claim 11 further comprising the step of noise reduction in the vertical spatial domain.

14. Apparatus for generating a chroma difference signal for controlling operation of a time domain chrominance noise reduction system operating upon a chrominance component of a quadrature modulated color television signal, said apparatus comprising:

a chroma input for receiving an incoming demodulated chroma component, a summing junction having a first input connected to said chroma input and having an output, processor means connected to said output of said summing junction for generating a Vout function in accordance with the following expression:

$$V_{out} = \frac{V_{in} \text{ delayed by } (F1 + \tfrac{1}{2}H) + V_{in} \text{ delayed by}(F1 - \tfrac{1}{2}H)}{2},$$

where Vin equals the incoming chrominance component, F1 equals a field interval, and ½H equals one half of a line interval of said color television signal, a difference junction connected to said output of said summing junction and to subtract therefrom said Vout function from said processor to yield a difference value, coefficient of recirculation amplifier means connected to said difference junction for amplifying said difference value in accordance with a predetermined coefficient of recirculation to yield a recirculation value, logic generator means connected to receive said color television signal to determine picture conditions therein and to generate a logic signal in accordance therewith, linear multiplier means connected to multiply said recirculation value by said logic signal, to yield a demodulated chroma difference signal, the output of said multiplier means being connected as a second input to said summing junction to recirculate said demodulated chroma difference signal with said incoming chroma component.

15. The apparatus as set forth in claim 14 wherein said logic generator means comprises:

input means for receiving said quadrature modulated color television picture signal;

chroma level detection means connected to said input means for detecting the presence of a chroma component in said color television picture signal, and for putting out a first control value whenever chroma level is above a predetermined minimum chrominance level, black level detection means connected to said input means for detecting that luminance level is below a predetermined minimum luminance level and for putting out a second control value whenever luminance is below said minimum luminance level.

16. The apparatus as set forth in claim 15 further comprising larger input gate means having one input connected to receive said first control value and having a second input connected to receive said second control value, and for putting out as a first control signal the larger one of said two input values.

17. The apparatus set forth in claim 15 further comprising black level inhibit means for inhibiting said second control value during horizontal transitions detected by said inhibit means in a luminance component of said color television picture signal.

18. The apparatus set forth in claim 15 further comprising chroma level detection inhibit means for inhibiting said first control value whenever chroma is not present in said color television picture signal above a minimum chroma level, and whenever a luminance horizontal transition component is present in said color television picture signal.

19. The apparatus set forth in claim 18 further comprising override means responsive to said chroma level detection means and being connected for overriding said chroma level detection inhibit means whenever chroma is present in said color television picture signal above a predetermined chrominance value.

20. The apparatus set forth in claim 16 further comprising control path means connected to said difference junction and responsive to said difference value to yield a processed difference value and further comprising second larger input gate means having one input connected to receive said processed difference value and having a second input connected to said first larger input gate means to receive said first control signal, and for putting out as a second control signal the larger one of said two input values.

* * * * *

UNITED STATES PATENT AND TRADEMARK OFFICE
CERTIFICATE OF CORRECTION

PATENT NO. : 4,670,775

DATED : June 2, 1987

INVENTOR(S) : Yves C. Faroudja et al.

It is certified that error appears in the above-identified patent and that said Letters Patent is hereby corrected as shown below:

The title page showing the illustrative figure should be deleted to appear as per attached page.

In the drawings, Sheet 1, Fig. 1 should be replaced with the correct drawing as shown on the attached sheet.

Signed and Sealed this

First Day of August, 1989

Attest:

DONALD J. QUIGG

Attesting Officer

Commissioner of Patents and Trademarks

United States Patent [19]

Faroudja et al.

[11] Patent Number: 4,670,775

[45] Date of Patent: Jun. 2, 1987

[54] INTER-DIMENSIONAL CHROMINANCE NOISE REDUCTION SYSTEM

[75] Inventors: Yves C. Faroudja, Los Altos Hills; Jack J. Campbell, San Francisco, both of Calif.

[73] Assignee: Faroudja Laboratories, Inc., Sunnyvale, Calif.

[21] Appl. No.: 701,383

[22] Filed: Feb. 14, 1985

[51] Int. Cl.⁴ .............................................. H04N 9/64
[52] U.S. Cl. ................................................. 358/36
[58] Field of Search ................ 358/36, 37, 166, 167, 358/21 R

[56] References Cited

U.S. PATENT DOCUMENTS 4,242,704 12/1980 Ito ............................................. 358/36
4,268,855 5/1981 Takahashi ................................. 358/36
4,291,333 9/1981 Warnock ................................... 358/36
4,305,091 12/1981 Cooper ..................................... 358/36
4,568,969 2/1986 Kanemoto ................................. 358/36
4,573,070 2/1986 Cooper ..................................... 358/36

Primary Examiner—Michael A. Masinick
Attorney, Agent, or Firm—David B. Harrison

[57] ABSTRACT

Method and apparatus for controlling operation of a time domain noise reduction system in a color television picture signal path by: detecting spatial picture characteristics in the path and detecting occurrence of temporal picture changes on a field by field basis, generating a control signal in relation to the detected spatial and temporal picture characteristics and applying the control signal to control time domain operation of the noise reduction system.

20 Claims, 3 Drawing Figures

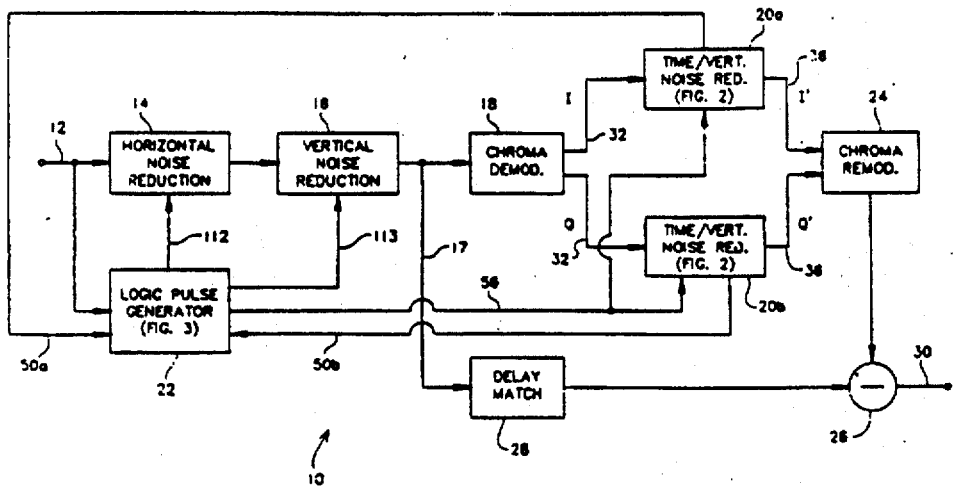

UNITED STATES PATENT AND TRADEMARK OFFICE
CERTIFICATE OF CORRECTION

PATENT NO. : 4,670,775

DATED : June 2, 1987

INVENTOR(S) : Yves C. Faroudja et al.

It is certified that error appears in the above-identified patent and that said Letters Patent is hereby corrected as shown below: